Jan. 29, 1957 M. M. HOPPER ET AL 2,779,582
CONICAL PENDULUM SPEED CONTROL
Filed Sept. 16, 1953 3 Sheets-Sheet 2
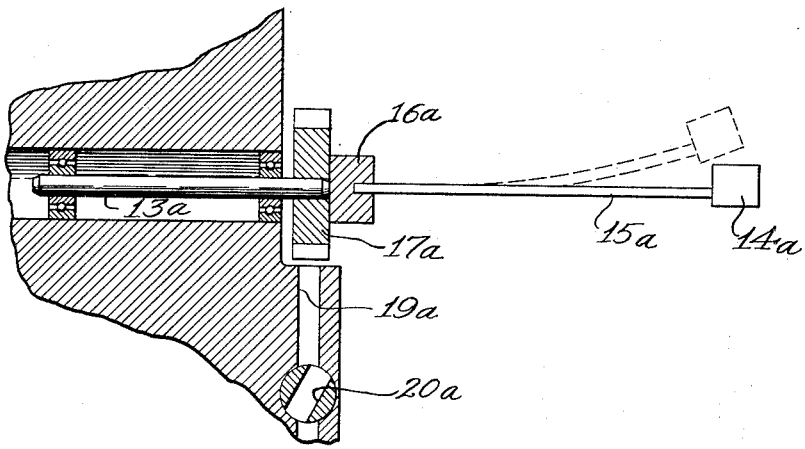
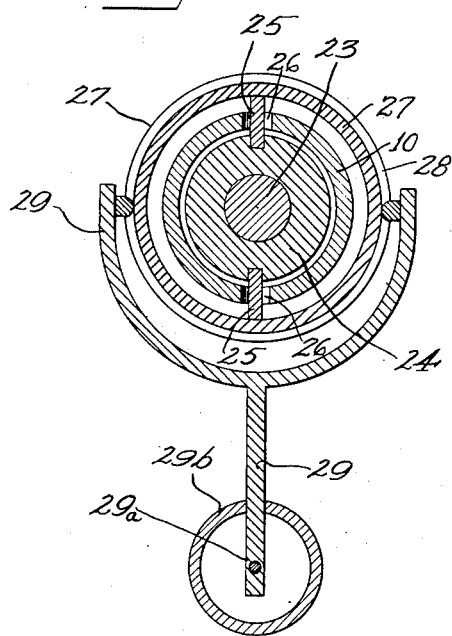
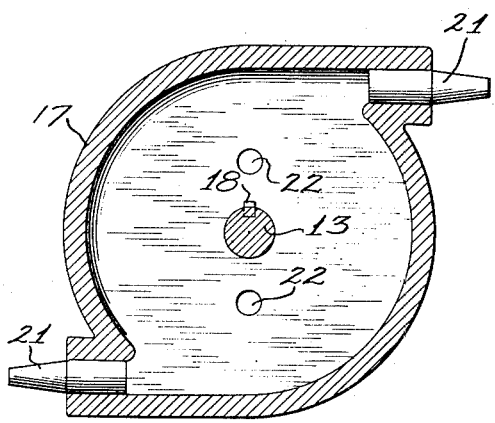
Inventors
Malcolm M. Hopper
Allen E. Lepley Jan. 29, 1957 M. M. HOPPER ET AL 2,779,582
CONICAL PENDULUM SPEED CONTROL
Filed Sept. 16, 1953 3 Sheets-Sheet 3

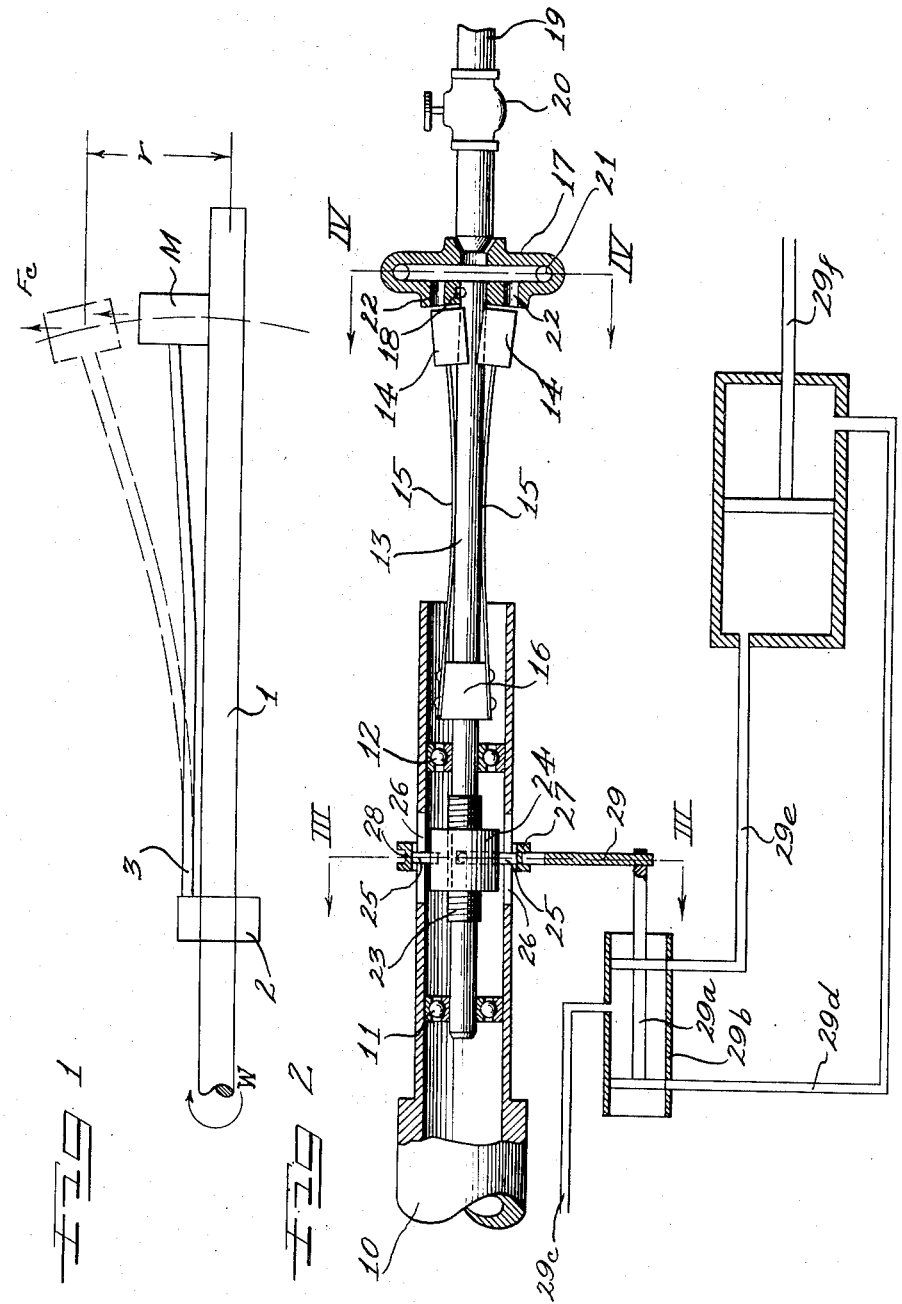

Inventors
Malcolm M. Hopper
Allen E. Lepley

United States Patent Office 2,779,582
Patented Jan. 29, 1957

2,779,582
CONICAL PENDULUM SPEED CONTROL

Malcolm M. Hopper, Willoughby, and Allen E. Lepley, Wickliffe, Ohio, assignors to Thompson Products, Inc., Cleveland, Ohio, a corporation of Ohio Application September 16, 1953, Serial No. 380,405

4 Claims. (Cl. 264—9)

The present invention relates to speed control systems and more particularly involves apparatus for maintaining constant speed in systems having motors under the control of a variable fuel inlet such as a throttle.

It has long been recognized in the field of control systems that for modern high performance speed control systems an accurate, stable and completely reliable mechanism for measuring the speed and controlling corrective action is required. In the prior art systems of which I am aware, this requirement is usually met through the use of complex anti-hunting systems providing intricate damping control. It has been the desire of those in the field to produce a speed measuring and correcting apparatus which does not require such intricate damping mechanisms or other similar controls for the prevention of hunting, and to provide such a system without incurring the usual expense found in complex speed control systems.

Through the use of an extremely simple apparatus, long known to physicists, the present speed control system provides such an anti-hunting system without the need for elaborate control equipment or other expensive components. By utilizing what will hereinafter be termed a "conical pendulum," applicants have accomplished the provision of a speed sensing system capable of absorbing small quantities of torque tending to increase the rotation of the speed control shaft and to replace that torque upon a tendency of the shaft to decrease its speed. Thus, by the use of this simple device applicants have been enabled to provide an extremely stable constant speed reference component which may be coupled in a control system to provide extreme accuracy and non-hunting characteristics.

The construction contemplated provides a rotating element having secured thereto at least one mass capable of movement radially of the rotating element. This mass is secured to the rotating element by means of a leaf-type spring which extends substantially parallel to the axis of the rotating member for a substantial distance and which has a normal residual biasing effect tending to maintain the mass tightly against the rotating member.

For reasons which will be developed later, this apparatus will tend to run at a constant critical speed and small forces tending to change this speed will result instead in changes in position of the spring and mass relative to the rotating element. Thus, the rotating element is maintained at a constant speed and may therefore serve as a reference point, or as an on-off control system in and by itself.

It is therefore an object of the present invention to provide a simplified, constant-speed control system.

A further object of the present invention is to provide a speed control system capable of storing and releasing energy to thereby smooth out tendencies toward speed variation and provide a constant speed control.

Still another object of the present invntion is to provide a very stable comparative speed control system.

Yet a further object of the present invention is to provide a conical pendulum type of speed control in which constant speed reference is maintained through the provision of spring controlled, centrifugally moving, weights.

A feature of the present invention is the use of cantilever mounted centrifugal weights wherein the cantilever is a leaf spring.

Still another feature of the present invention is the provision of an on-off type of critical speed reference control having very high stability within narrow energy input levels.

A further feature of the invention is an air driven standard reference speed control.

Yet another object of the present invention is to provide an energy absorption and return speed control in which energy tending to increase speed of rotation is absorbed without permitting an increase in speed and is thereafter returned to the rotating shaft to prevent an undesired decrease in speed.

Still other and further objects will at once become apparent to those skilled in the art from a consideration of the attached sheets of drawings in which several modifications of the present invention are shown by way of illustration only.

On the drawings:

Figure 1 is a diagrammatic view of the conical pendulum of the present invention with numerals of reference marked thereon for aid in discussing the theory of operation of the present invention.

Figure 2 is a diagrammatic showing of a control system constructed according to the concepts of the present invention;

Figure 3 is a cross sectional view taken along the line III—III of Figure 2;

Figure 4 is a cross sectional view taken along the line IV—IV of Figure 2.

Figure 6 is a further modified form of constant speed control for use with the present invention;

As shown on the drawings:

Figure 7:
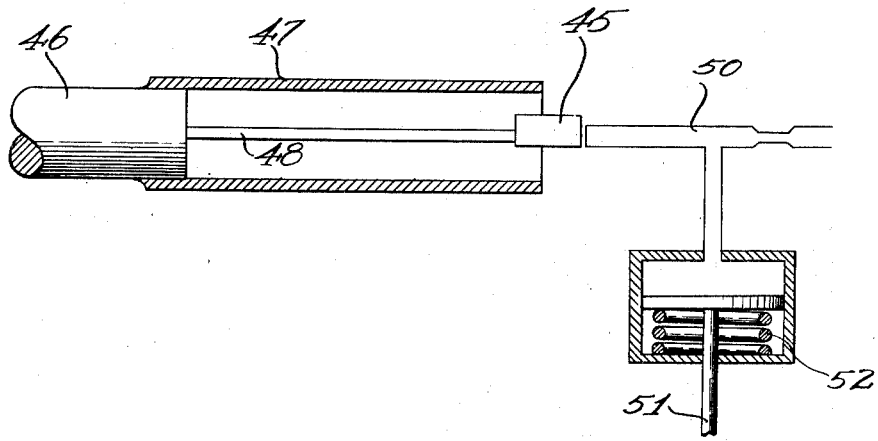
Figure 7 is still another modified form of speed control forming a part of the present invention.

The fundamental concepts upon which the present invention is based may be understood from a consideration of Figure 1. In that figure a rotating shaft 1 is provided having a collar 2 secured for rotation therewith. Rigidly secured to the collar 2 is a cantilever leaf spring 3 having a mass M secured at its free end. As may be seen from Figure 1, the leaf spring 3 is initially deflected or prestressed to provide a resulting force acting on the mass M tending to maintain it tightly against the rotating shaft 1 whenever the shaft 1 is stationary or rotating at less than a predetermined critical speed. The leaf spring 3 will prevent rolling such as might occur with the use of a wire or rod of circular cross-section due to uniform bending movements in all directions. The flat leaf spring 3 has a directional bending moment.

When the shaft 1 rotates, centrifugal force acts upon the mass M tending to move it radially outwardly away from the shaft 1. This force which is termed $F_c$ is a quantity well known in the art and is related to the weight of the mass M, the angular velocity or rotation $w$ of the shaft 1 and the distance $r$ of the mass M from the rotating shaft. The equation is thus generally $$F_c = Mw^2r$$

where $w$ denotes the angular or rotational velocity of the rotating shaft and $r$ denotes the distance of the mass $M$ from the center of rotation. It will thus be seen that the centrifugal force or force tending to move the mass $M$ away from the shaft 1 is proportional to the squares of the velocity or speed or rotation of the shaft but is directly proportional to both the mass and the radius.

Outward movement in a radial direction, of the mass $M$ is resisted, of course, by the spring 3. If a balanced or steady state be assumed in which the shaft 1 is rotated at a speed sufficient to cause the mass $M$ to move outwardly slightly to a radial distance $r$ at which it is balanced, it is clear that a force equal to the centrifugal force $F_c$ must be acting radially inwardly toward the rotating shaft. This inwardly acting force is termed $F_s$ and for the steady state condition above described $F_s$ must necessarily equal $F_c$. $F_s$ equals the spring constant, known as $K$ of the leaf spring 3, times the deflection of the spring. Since the cantilever spring is relatively long, for deflection in the vicinity of the shaft the deflection of the spring may be considered for practical purposes to be equal to the distance of the mass from the rotating shaft 1 or $r$ above defined. Thus, $F_s$ may be stated to equal $Kr$.

In the steady state condition above mentioned in which $F_c=F_s$, and where the spring is preloaded so that $F_c=F_s$ when $r=0$ it is clear that $Mw^2r=Kr$ and thus that $$w=\sqrt{\frac{K}{M}}$$

This figure is clearly constant indicating that for a steady state condition, $w$, or the speed of rotation of the shaft, must have a particular speed for any one mechanical construction. This speed will be termed the critical speed hereinafter. The device is, nevertheless, practical and useful when the unloaded position of the spring is slightly spaced off center from the shaft axis.

The critical speed provides a point of relatively unstable equilibrium since it will be clear from the equations above noted that any increase in speed or increase in $w$ will immediately cause the mass to fly out until detained by some mechanical stop. This is true because the centrifugal force acting on the mass $M$ is proportional to the square of the $w$ while the spring force acting to retain the mass inwardly is proportional only directly to the radius and the constant spring factor. Likewise if the speed of rotation is reduced the force tending to move the mass $M$ outwardly is reduced by the square of the velocity or speed of rotation and the mass will immediately move into tight engagement with the rotating shaft 1 as soon as the speed is slowed to a point below the critical speed.

While the critical speed is in a sense quite critical in that variations from it will cause large movements in the mass $M$, nevertheless, the movements of the mass $M$ may be utilized as a stabilizing force. This is true because in order to move the mass $M$ energy must be inserted into the system to deflect the spring 3. Thus, if a force is applied to the rotating shaft 1 tending to increase the rotational speed, $w$, and thereby tending to force the mass $M$ outwardly to its maximum extent, spring 3 must be deflected before the speed, $w$, can change. The power or energy absorbed by the spring during the attempt to increase the speed will prevent increase in speed and when the force tending to increase the speed is removed and a slight fluctuation in energy tending to permit the shaft 1 to slow down occurs, the energy will be returned by the spring to the system tending to maintain the speed of the shaft 1 at its constant critical speed.

Therefore, relatively small changes in rotative torque above and below the exact amount required to rotate the shaft 1 at its critical speed will be absorbed and released by the spring 3 supporting the mass $M$. It is, of course, understood that this system does not dissipate energy, it merely stores relatively small amounts of energy in cases where small fluctuations may be present.

This principle is utilized in the present invention to provide a speed control system in which the standard or reference element is maintained at a constant rotative speed by means of the spring and pendulum above discussed.

Figures 2 and 3 and 4 show the use of such a conical-pendulum construction in the control of a power system such as, for example, an engine or air driven turbine. A hollow sleeve shaft 10 is driven from the controlled turbine, either at the same speed as the turbine shaft or at a speed which is proportional thereto. Mounted within the rotating shaft 10 and supported in the bearings 11 and 12, is mounted a freely rotatable shaft 13. The shaft 13 is the equivalent of the rotating shaft 1 above described and has mounted thereon a pair of masses 14 secured to springs 15 which are in turn securely attached to the shaft 13 by means of the fastening 16.

It is intended that the shaft 13 shall rotate at a predetermined critical or standard reference speed. This is accomplished by means of a small Hero's type turbine 17 which is secured to the shaft 13 by means of a key 18 or any other similar fastening mechanism. The Hero's turbine is driven by compressed air which is supplied from the source 19 through an adjustable valve 20. The compressed air is vented through the tangentially mounted nozzles 21 and may also be vented as hereinafter described through the axially directed vents 22.

By manipulating the valve 20, the Hero's turbine 17 may be adjusted to operate or rotate at the speed at which the masses 14 will position themselves in a steady state condition, i. e., as above noted a position in which the masses 14 are stable and are neither tending to move inwardly against the shaft nor attempting to move outward to a maximum deflection. Should any small fluctuations in air pressure coming through the valve 20 attempt to cause the Hero's turbine to speed up slightly, this added torque will immediately cause the masses 14 to attempt to move outwardly. This outward movement will absorb the added energy without causing a change in angular speed. At the same time the masses 14 will uncover the axially directed ports 22 thereby reducing somewhat the pressure in the Hero's turbine causing the turbine to decrease in speed slightly, thereby reducing the torque to the rotating shaft 13. This reduction will cause the springs 15 to release the stored energy and return to their stable position. Thus, the actual speed of the rotating shaft 13 does not change, the increases and decreases in torque being absorbed and released in the conical pendulum construction.

The standard reference speed 13 is thus extremely constant and may be utilized to control a speed regulator for the driven turbine. This is accomplished as shown in Figure 2 by providing a threaded portion 23 on the shaft 13 and threaded nut 24 rotatably fixed relative to the shaft 10. The nut 24 is provided with interengaging radially projecting bosses 25 passing through the slots 26 in the sleeve 10. The bosses 25 are secured to a shifting ring 27 which has a groove 28 therein. Freely mounted in the groove 28 is a shifting fork 29 which is in turn connected to a reciprocating pilot valve 29a.

In operation, the standard reference speed of the shaft 13 is brought within its range of critical speed and energy storage by means of the valve 20 to operate at the desired speed of the turbine. Then, since the shaft 10 is rotating at the speed of the turbine, any variation between the speed of the shaft 10 and the standard reference speed 13 will cause a relative rotation between the threads 23 and the nut 24. This relative rotation will cause an axial movement of the ring 27 and hence movement of the shifting fork 29. The shifting movement of the fork 29 will, of course, cause the pilot valve to reciprocate within the pilot valve housing 29b venting the air pressure in the conduit 29c to the chamber 29d or 29e, thereby actuating a speed regulating mechanical connection 29F.

The speed regulating apparatus, such as a throttle, forms no part of this invention and it is understood that any type of throttle or engine control may be utilized with the present referencing system.

Figure 5:
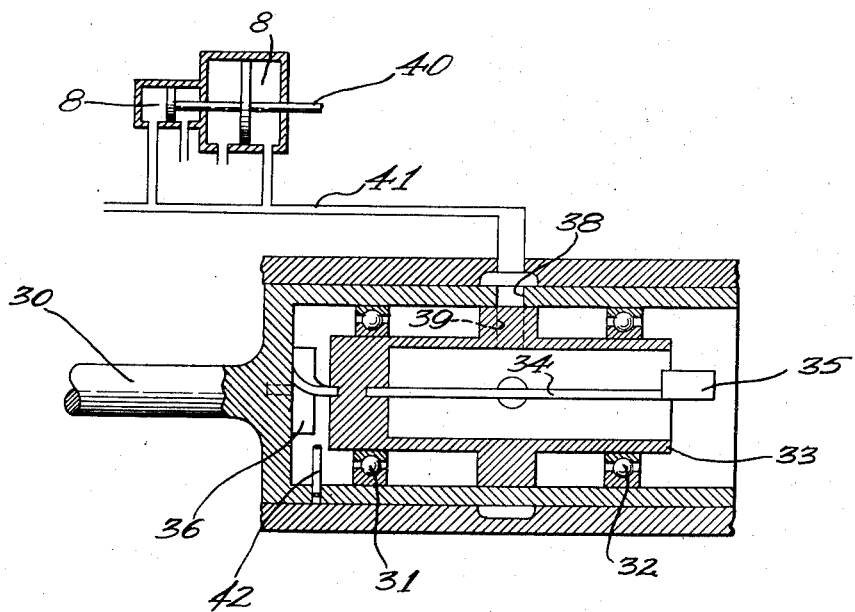
Figure 5 is a diagrammatic showing of a modified form of speed control, constructed according to the present invention.

In the construction shown in Figure 5, the principle of operation above described is again utilized in a speed control system. In this case a shaft 30 is connected in the same manner as shaft 10 to a rotating part of the driven turbine or similar engine. Within the shaft 30 and mounted for free rotation relative thereto by means of the bearings 31 and 32 is a speed reference shaft 33. Secured for rotation with the shaft 33 and mounted therein is a leaf spring 34 having a mass 35 eccentrically mounted at the outer end thereof.

As in the case of the shaft 13 shown in Figure 2, rotation of the shaft 33 will cause the spring 34 to deflect when the shaft 33 reaches a critical speed and shaft 33 will not increase above the critical speed until sufficient energy is imparted to rotate the shaft 33 as to cause the mass 35 to move radially outwardly to abut against the inside diameter of the shaft 33.

In effect, the shaft 33 will therefore pick up speed from a standstill, until it reaches a critical speed, at which time a slight additional increase in rotative torque will not cause an increase in speed but will instead merely cause a storing of this rotational increase in torque in deflection of the spring 34. After the mass 35 has deflected its maximum extent, further increase in speed would of course be possible upon the addition of an increase in rotative torque. In the installation shown in Figure 5, the rotative torque applied to the shaft 33 is supplied by means of a coil spring 36 having one end secured to the shaft 30 and the other end secured to the shaft 33.

When the shaft 30 is rotated by the engine, as in the case of shaft 10 above described in connection with Figure 1, it will tend to rotate the shaft 33 with it through the spring 36. However, when the entire body of the shaft 30 and the shaft 33 reach the critical speed of the conical pendulum 33, 35, any tendency to increase its speed will not cause a corresponding increase in the speed of the shaft 33, assuming that the energy tending to cause such an increase is of a relatively nominal amount. This tendency to stay, at least temporarily, at a constant speed will cause a relative rotative movement between the shaft 33 and the shaft 30, which relative movement is permitted by the resilient connection at 36.

The relative rotation between the shafts 33 and 30 is utilized to provide a corrective control by providing axially aligned ports 38 and 39 in the shafts 30 and 33, respectively. These ports are constructed to be normally aligned when the shafts 30 and 33 are rotating together with the resilient spring 36 in its normal relatively unstressed condition. However, upon a tendency of the shaft 33 to maintain itself at a critical speed while the shaft 30 is tending to increase slightly over the critical speed, the ports 38 and 39 become slightly disaligned thereby causing an increase in pressure in the chamber 8 which acts to close the throttle or similar speed regulating device to reduce the speed of the shaft 30. Of course, upon reduction of the speed of the shaft 30, the shaft 33 will return energy stored in the spring 36 and in the spring 34 to cause the shaft 30 to operate at its desired speed.

It is, of course, understood that due to the fact that the control system here involved is capable of absorbing only small amounts of energy, the control shown in Figure 5 is most adapted for use in controlling turbines or similar mechanism operating under low fluctuations in torque since a high fluctuation in torque would overpower the absorption characteristic of the rotating shaft 33 permitting an increase in speed thereof. When such a condition occurs there will be slight fluctuations in the speed of the shaft 33 and hence the control will not be as extremely accurate as the control shown in Figure 2. However, due to the fact that in any situation in which the shaft 33 has absorbed its maximum amount of torque and the spring 34 is deflected to its maximum, the ports 38 and 39 will also be disaligned and there will be a tendency for the system to right itself and thereby relieve itself of the extra torque imposed on the shaft 30.

The above mentioned word of caution is of course not pertinent where an extremely fast acting correction device is utilized at 40 since, in such circumstances it would be impossible for an excess of torque to develop at the shaft 33. This is true since the shaft 33 is an extremely sensitive indicator of the torque and its tendency to maintain itself at the critical speed until the spring 34 absorbs the extra torque would immediately cause disalignment of the ports 38 and 39.

In connection with the showing in Figure 2, it is to be understood that the ports 38 and 39 may be positioned in initial misalignment and moved into alignment upon an increase in torque at the shaft 30. This reversal of construction would not cause a difference in operation as long as the regulator 40 were also reversed in its operation so that the speed would be decreased upon a decrease in pressure in the line 41. A further feature which is noted at this point is the provision of a stop 42 which will prevent an over-rotation of the shaft 33 relative to the shaft 30. This stop is provided to prevent injury to the spring 36 in case of violent application of torque or accelerating forces to the shaft 30.

In Figure 6, a modified form of constant speed shaft similar to that utilized in Figure 2 is shown. Here, a shaft 13a is rotated by means of an impulse type of air turbine 17a driven by means of the air passing through a tangential orifice 19a under the control of a valve 20a. A mass 14a is secured at the outer end of a cantilever spring 15a which is in turn rigidly secured to the shaft 13a by means of the coupling 16a.

As was the case relative to the showing of Figure 2, the valve 20a is controlled to cause the turbine 17a to rotate substantially at the desired constant reference speed. This reference or critical speed will be that speed at which the mass 14a is in a balanced condition when the centrifugal force is exactly equal to the force exerted by the spring 15a to return the mass to a central position shown in solid lines. Upon an increase in speed, the mass 14a will attempt to move to its maximum outer position and in so doing will cause deflection of the spring 15a thereby storing up energy in the manner described relative to the structure of Figure 2.

When the mass moves outwardly radially, however, resistance to rotation will be increased by impact of the mass upon the air. For this purpose in the modification shown in Figure 6, the mass is constructed to have a definite resistance to movement through air thereby providing an increasingly powerful airbrake as the deflection of the spring increases. This airbrake will cause a resisting torque tending to slow the turbine 17a down thereby causing the spring 15a to return to its undeflected condition and restoring energy to the shaft 13a to maintain its speed at critical speed.

In Figure 7, an on-off type speed control unit is shown utilizing the critical nature of the conical pendulum herein discussed. The mass 45 is caused to rotate with the shaft 46 which is driven in response to turbine speed. A shield 47 is provided for preventing overflexing of the spring 48 by which the mass 45 is supported. At rotation at or below the critical speed, the centrifugal weight or mass 45 retains its position as shown in Figure 7. However, upon increase in torque tending to increase the speed of the shaft 46, the weight 45 will move outwardly until it abuts against the sleeve 47, at which time the conduit 50 will be vented to atmosphere and the speed control 51 will be operated by the spring 52 to reduce the speed of the turbine causing the shaft 46 to rotate.

If the speed regulatory device is sufficiently sensitive, substantially no change in speed will occur in the shaft 46 since the spring 48 is capable of absorbing a small amount of torque before the speed of the shaft 46 is allowed to increase. However, in use of the device with a normal speed control system in which speed control is not immediately responsive, and in which the turbine or other controlled engine is a relatively powerful one, slight fluctuations will occur in the shaft 46 as the mass 45 fluctuates to its full extreme position against the sleeve 47 and the speed of the shaft 46 is permitted to increase slightly before the correction effect resulting from venting of the conduit 50 operates the speed control 51.

The various structures herein discussed and described have been shown in a relatively schematic form. In actual construction of these devices, the parts could of course take substantially identical form to those disclosed. However, certain precautions would be desired in installations having rapidly fluctuating speeds. In this connection it is noted that the mass connected to the cantilever spring must be limited in movement to movement in a radial direction only rather than in a circular path about the shaft. Thus, radially extending guides may be desirable for controlling movement of the mass to prevent the spring and mass from wrapping around the shaft rather than moving in a radially outward direction necessary to absorb energy to an optimum degree.

It is, of course, apparent that the relatively simple yet effective construction herein disclosed may be utilized with various types of control units and further applications will undoubtedly occur to those skilled in the art from the above description. It is, therefore, not intended to limit this invention beyond the scope necessitated by the appended claims.

We claim as our invention:

1. In a constant speed control system, a first rotating shaft connected to an element to be controlled, a second rotating shaft supported thereby and rotatable relative thereto, means for maintaining said second shaft at a constant speed and operable to retard said second shaft relative to said first shaft when said first shaft tends to rotate above a predetermined speed of said second shaft, said last named means comprising a mass supported eccentrically of said second shaft by a cantilever beam rigidly secured to said second shaft and extending substantially parallel thereto, and means for modifying the power applied to said element upon relative movement between said first and second shafts to thereby modify the torque applied to said first shaft to cause said first shaft to rotate at the same speed as said second shaft.

2. A speed controlling device for maintaining the speed of a rotating shaft constant comprising an axial bore within said shaft, a rotating shaft positioned within said bore and freely rotatable relative to said shaft, means for rotating said second shaft at constant speed, said last named means comprising a source of power for said second shaft a cantilever spring positioned substantially parallel to the axis of said second shaft and carrying a weight eccentrically at its free end said weight and spring absorbing increases in torque tending to increase the speed of said second shaft upon rapid increase in speed of said first shaft whereby relative rotation is provided between said shafts on such increase in torque, and control means actuated by relative rotation between said first and second shafts for modifying the energy applied to said first shaft to cause it to rotate at said constant speed of said second shaft.

3. A speed controlling device for maintaining the speed of a rotating shaft constant comprising, a source of power for rotating said shaft a cantilever spring secured to said shaft and lying substantially parallel to the axis thereof, a weight secured to the free end of said spring, said spring acting to maintain said weight in close proximity to the axis of said shaft, and means controlled by the position of said weight for modifying the effective torque applied to said shaft causing its rotation, said means comprising pressure relief vents in the power source causing rotation of said shaft and positioned adjacent said weights for closure thereby below a desired speed.

4. A constant speed control device comprising a source of fluid pressure, means for rotating a control shaft by said pressure, means secured to said shaft for preventing its rotation above or below a critical speed as a result of small torque variations, said last named means comprising a cantilever beam secured to said control shaft generally parallel thereto and having a mass secured at the free end thereof and normally covering a vent in said control shaft rotating means for by-passing said fluid pressure when said mass moves radially outwardly on application of torque to said control shaft tending to increase the speed thereof above a predetermined value, a second shaft driven by a device to be controlled, and differential means associated with said first and second shafts for controlling the power supply to the controlled device to thereby maintain the speed of said second shaft identical to that of the first shaft.

References Cited in the file of this patent
UNITED STATES PATENTS

| | | |
|---|---|---|
| 287,822 | Gardner | Nov. 6, 1883 |
| 380,824 | Schlepegrell | Apr. 10, 1888 |
| 590,954 | Bayle | Oct. 5, 1897 |
| 795,705 | Kimball | July 25, 1905 |
| 865,082 | Cassel | Sept. 2, 1907 |
| 2,646,813 | Mueller | July 28, 1953 |